United States Patent [19]

Brouwer

[11] 4,243,114
[45] Jan. 6, 1981

[54] DIFFERENTIAL CAPACITOR AND CIRCUIT

[76] Inventor: Frans Brouwer, 410 Greenwood Ave., Glencoe, Ill. 60022

[21] Appl. No.: 21,166

[22] Filed: Mar. 15, 1979

[51] Int. Cl.³ .............................................. G01G 3/00
[52] U.S. Cl. ............................. 177/210 C; 324/61 R; 361/283
[58] Field of Search .................... 177/210 C; 361/283, 361/280, 287, 290, 292; 340/200; 324/61 R

[56] References Cited

U.S. PATENT DOCUMENTS

| | | | |
|---|---|---|---|
| 3,479,588 | 11/1969 | Makow | 324/61 R |
| 3,680,650 | 8/1972 | Zimmer | 177/210 C |
| 3,783,374 | 1/1974 | Eide | 324/61 R X |
| 4,189,018 | 2/1980 | Brouwer | 177/256 |

*Primary Examiner*—Joseph W. Hartary

[57] ABSTRACT

A weighing scale having a differential capacitor transducer for generating an electrical signal proportional to the movement of a variable capacitor plate. The differential capacitor has a pair of fixed capacitor plates disposed in a parallel, spaced relationship with respect to one another with the variable capacitor plate being symmetrically disposed between the fixed plates. Each of the fixed plates is formed with double segments. Each segment of a plate is electrically isolated from the other segment of that plate and opposite adjacent segments of both plates are electrically connected to one another. A square-wave input voltage is applied between both sets of commonly connected segments. A square-wave output voltage is developed at the variable capacitor plate whose phase and amplitude varies in response to the weight of an object being weighed. Both square-wave input and output voltages are applied to a phase-sensitive discriminator which generates a weight-responsive direct-current voltage across a filter capacitor.

13 Claims, 14 Drawing Figures

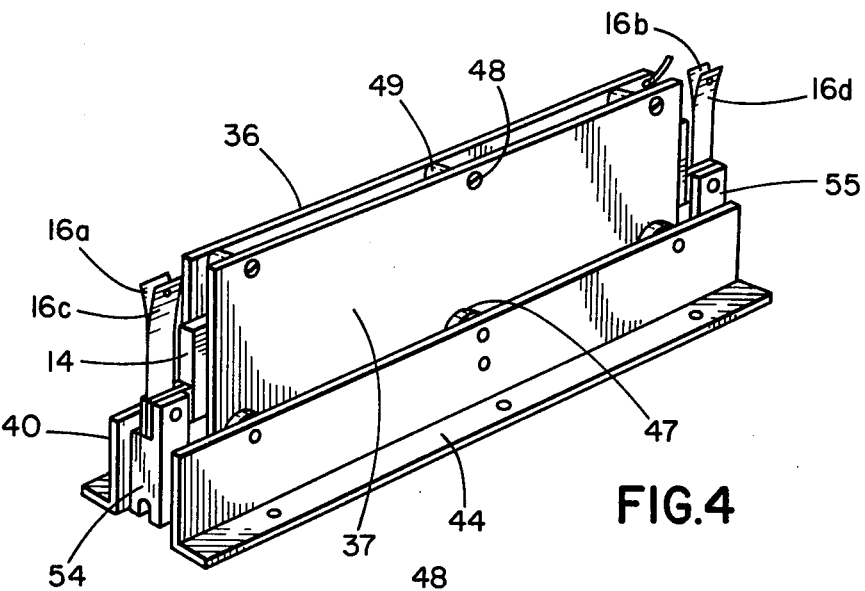
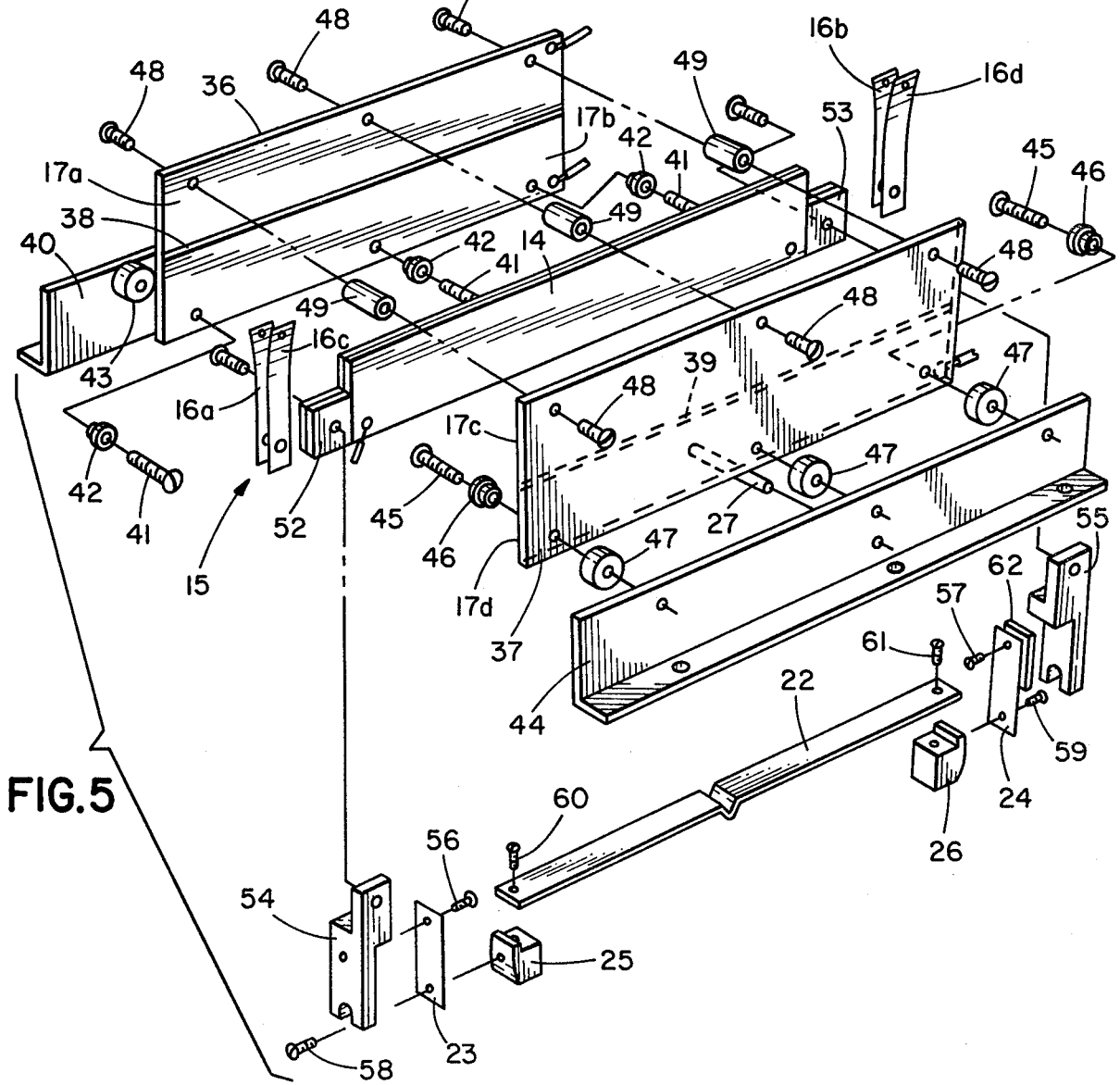

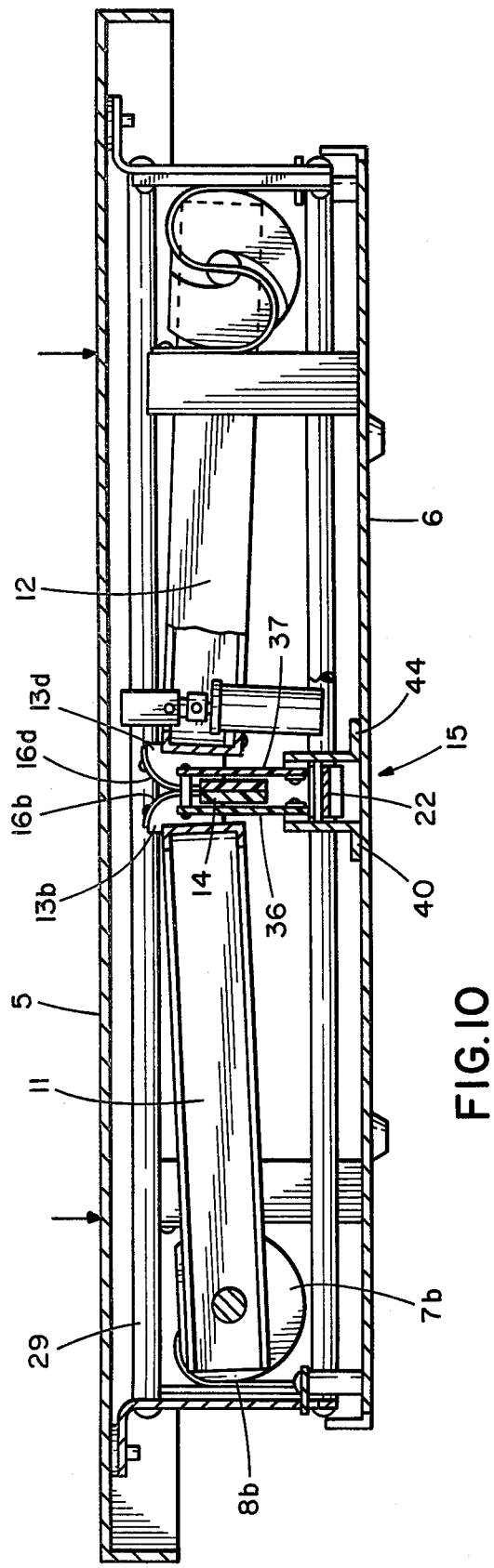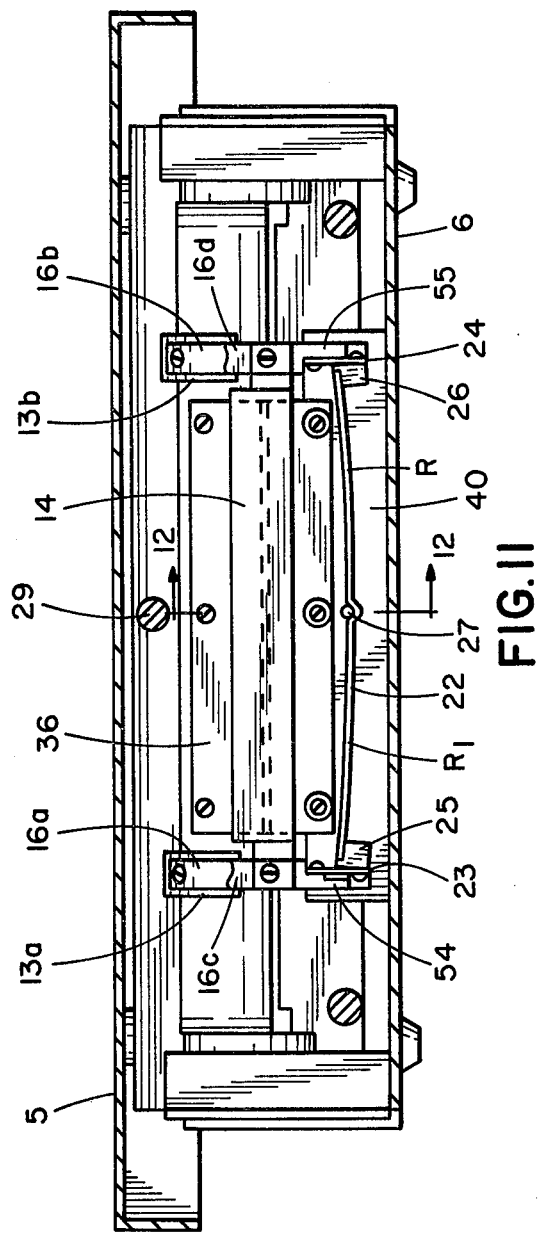

DIFFERENTIAL CAPACITOR AND CIRCUIT

BACKGROUND OF THE INVENTION

Platform weighing scales employing capacitors as weight responsive transducers are known in the art. In certain designs, particular capacitors of the differential type are associated with the signal generating circuitry. For example, U.S. Pat. No. 3,680,650 discloses a differential capacitor employed as a capacitive nulling device which is used to return the weighing transducer to a null position.

Many of the prior art scales employing capacitor transducers are highly susceptible to erroneous readings primarily because of the design of the capacitor and also its associated electronic circuitry.

BRIEF SUMMARY OF THE INVENTION

Accordingly, a principal object of this invention is to improve the reliability and accuracy of weighing scales.

Another object is to improve the design of differential capacitors and the circuits utilizing capacitors of this type.

In general, the foregoing objects are attained by a novel differential capacitor which employs to advantage two double-segmented fixed plates spaced from one another with a variable capacitor plate located between the fixed plates. Accordingly, the variable plate is electrically enclosed and is thus shielded from external sources of noise. Moreover, should misalignment occur in the sense that the variable capacitor plate moves closer to one set of double-segmented fixed plates and farther away from the second set, capacitance variations are essentially cancelled out.

The electronic circuit arrangement incorporating the differential transducer utilizes square waves both to energize the differential capacitor and to gate or switch a phase-sensitive detector. The resulting square-wave output developed at the variable capacitor plate varies both in phase and amplitude in response to the relative position of the movable plate to the fixed plates.

The output signal of the differential capacitor is amplified and passed through the phase-sensitive detector to produce a direct-current voltage whose amplitude and polarity is accurately responsive to scale weight.

DESCRIPTION OF THE DRAWINGS

In order that all of the structural features for attaining the objects of this invention may be readily understood, reference is made to the accompanying drawings wherein:

FIG. 4 is a perspective view of the weight responsive transducer of this invention which features a novel differential capacitor construction;

FIG. 5 is an exploded view of the components of FIG. 4;

FIG. 10 is a section view related to FIG. 7 modified to show the weight responsive movement of the ratio arms and the corresponding movement of the movable transducer (capacitor) plate;

FIG. 11 is a section view related to FIG. 8 modified to show the weight responsive movement of the variable capacitor plate and the measuring spring;

DESCRIPTION OF THE PREFERRED EMBODIMENT

Figure 1:
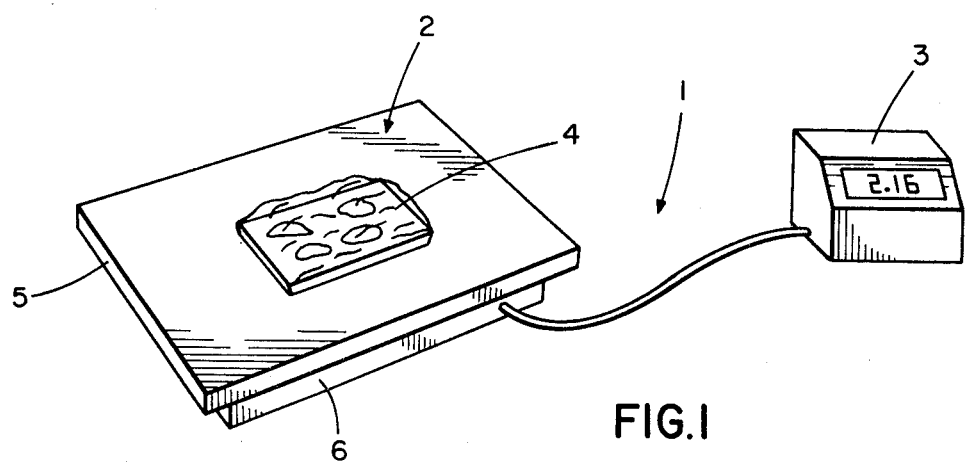
FIG. 1 is a view of the weighing scale of this invention showing the platform weighing unit in association with a digital readout module.

Referring to FIG. 1, the principal components of the platform-type weighing scale 1 to which the improvements of this invention are applied comprise platform weighing unit 2 and digital readout module 3. As is conventional in the art, item 4 to be weighed is placed on the platform of weighing unit 2 and the weight of the item is displayed digitally by module 3.

Figure 2:
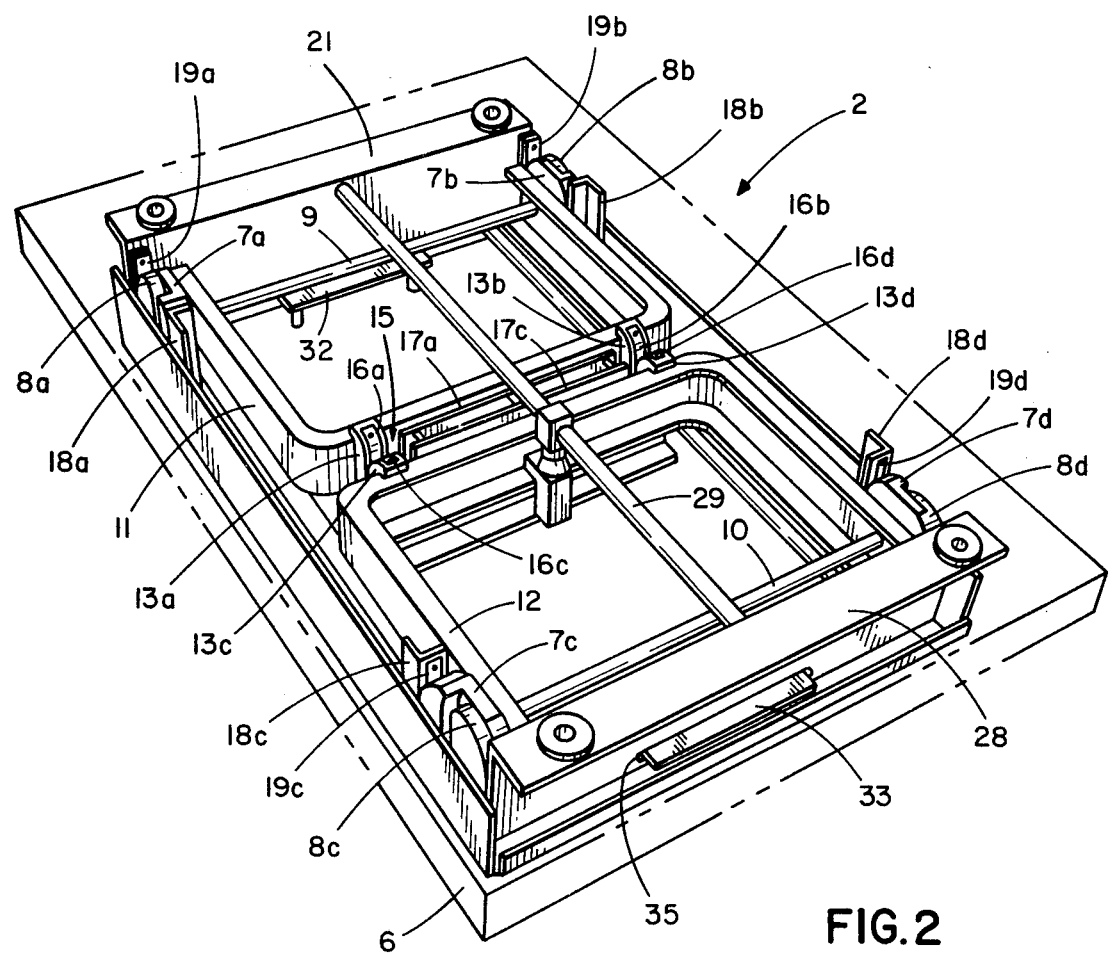
FIG. 2 is a perspective view of the weighing unit with the platform removed.
Figure 3:
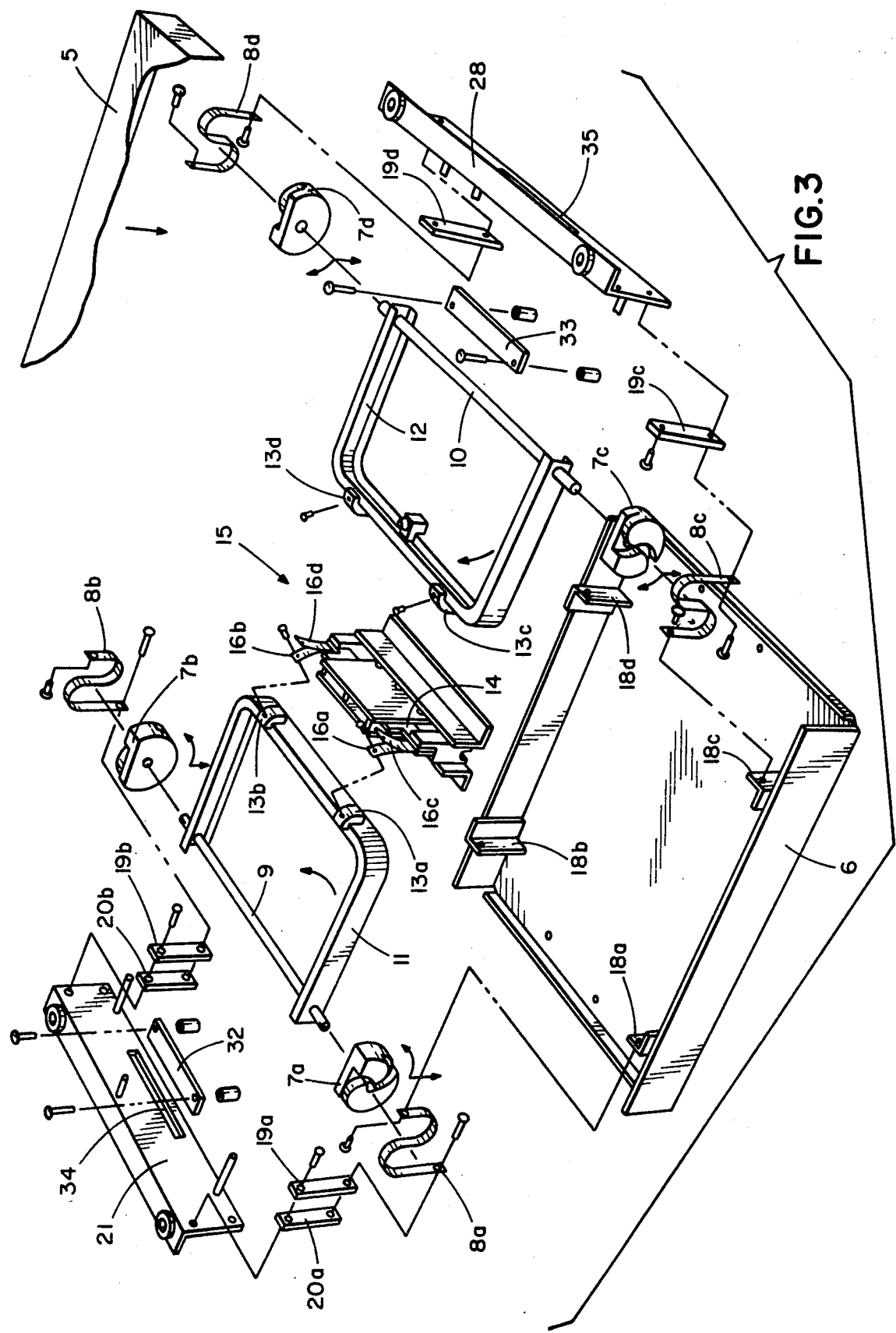
FIG. 3 is an exploded view of the components of FIG. 2.
Figure 6:
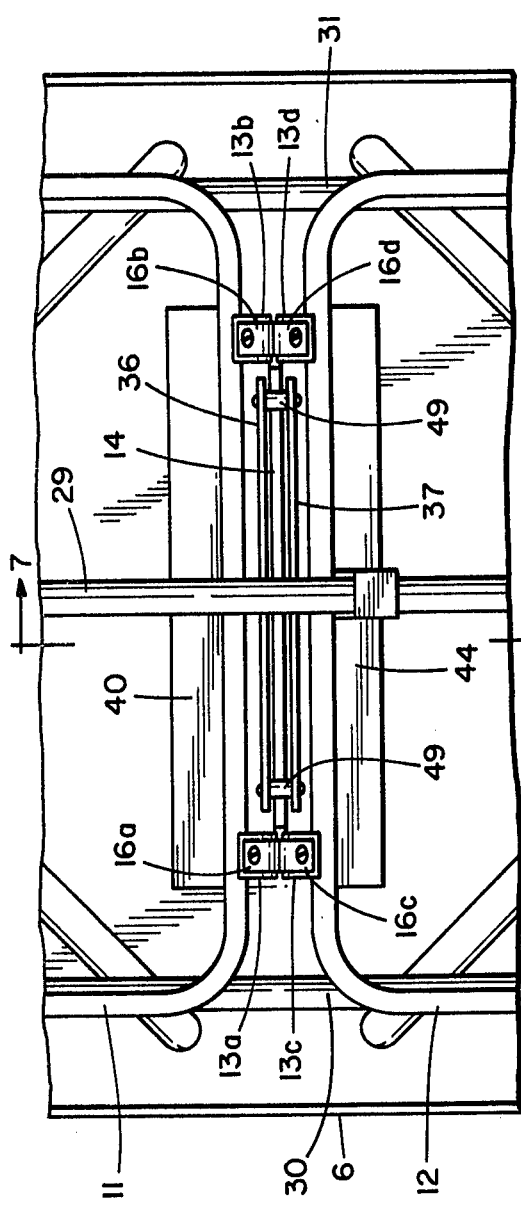
FIG. 6 is a plan view of the weight responsive transducer.
Figure 7:
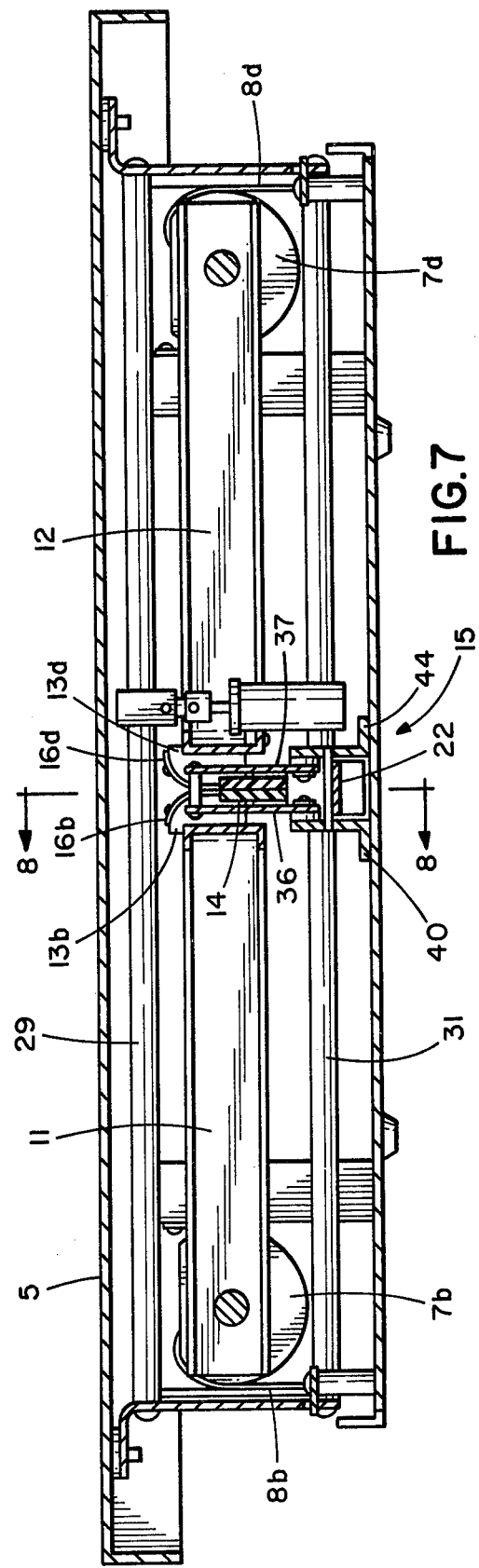
FIG. 7 is a section view taken along line 7—7 of FIG. 6 extended, however, to show the entire platform weighing unit.
Figure 13:
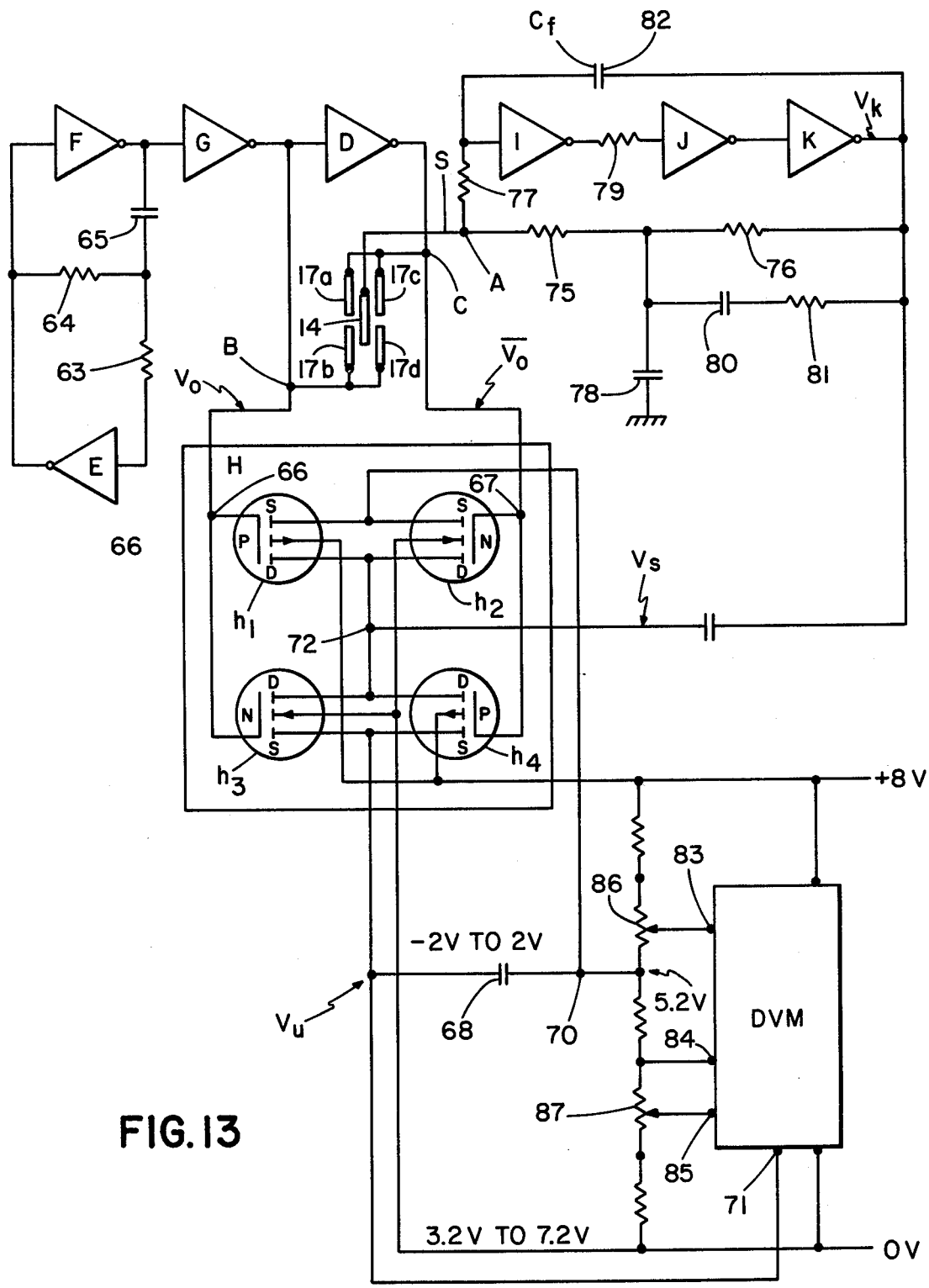
FIG. 13 is a schematic circuit diagram of a preferred electrical circuit interconnected to the weight responsive transducer.

Referring to FIGS. 2 and 3, a principal structural feature of this invention relates to a weight responsive transducer 15 and the electrical circuit connected to the transducer (FIG. 13). Transducer 15 has a movable or variable capacitor plate 14 which is actuated by a restrained ratio-pulley design which is the subject matter of the inventor's copending application entitled "Pulley and Tape Motion Linkage for Platform Weighing Scale", Ser. No. 962,326, filed Nov. 20, 1978, now U.S. Pat. No. 4,189,018. Platform 5 is movably supported relative base 6 of weighing unit 2 to effect movement of movable transducer element 14. In general, this support is effected by a set of four small pulleys (segments) 7a, 7b, 7c and 7d which carry metallic tapes 8a, 8b, 8c and 8d, respectively.

The pulley-tape 7-8 subcombinations enable platform 5 to move responsively relative base 6 in accordance with the weight of a particular item 4. The pulleys 7a,b are fixedly carried on a ratio-arm shaft 9; and pulleys 7c,d are fixedly carried on a ratio-arm shaft 10. The placement of weight 4 on platform 5 moves pulleys 7a,b,c,d in a restrained composite downward linear and rotating movement. The composite movement of the pulleys and their associated shafts 9 and 10 produces an amplified composite linear and rotating movement of the extremities of the U-shaped ratio-arms 11 and 12 which are fixedly attached to shafts 9 and 10, respectively.

Large pulley segments 13a and 13b are fixed to ratio-arm 11; and large pulley segments 13c and 13d are fixed to ratio-arm 12.

Small pulley segments 7a,b and their associated large pulley segments 13a,b cooperate as a restrained ratio pulley to operate in the manner hereafter set forth in detail. Similarly, small pulley segments 7c,d and their associated large pulley segments 13c,d also operate as a restrained ratio pulley.

The overall function of the ratio-pulley subcombinations 7-13 is to effect a weight responsive linear movement in variable capacitor plate 14 which is part of weight responsive transducer 15.

In the particular transducer 15 shown in the drawings, a movable or variable capacitor plate 14 is part of a differential capacitor 15 having four stator plates 17a,b,c,d. Movable capacitor plate 14 is coupled to large pulley segments 13a,b,c,d by tapes 16a,b,c,d. Thus, in brief summary, a weight responsive downward movement of platform 5 produces a composite downward and rotating movement of small pulley segments 7a,b,c,d which in turn produce corresponding movements in ratio arms 11 and 12. The movements of ratio arms 11 and 12 cause an amplified composite movement of large pulley segments 13a,b,c,d. The movement of the large pulley segments produces a linear and weight responsive movement in transducer element 14 because of the coupling of this element by tapes 16a,b,c,d to large pulley segments 13a,b,c,d.

The set of ratio pulleys involving small pulley segments 7a,b,c,d and large pulley segments 13a,b,c,d improves the weighing accuracy because the operative portions of tapes 8a,b,c,d and 16a,b,c,d are moved in circular paths which are defined by circular segments of ratio pulleys.

Additionally, in the pulley-tape linkages, the pulleys are restrained so that the movement of pulleys 7a,b,c,d are defined by a pair of elements which sandwich each small pulley 7a,b,c,d for a composite linear and rotary motion between parallel surfaces with only circular sectors of each pulley segment contacting the parallel surfaces. Also, it has been found essential to improved accuracy that the tapes cooperating with each small pulley segment diametrically contact the circular sectors, and that any looseness in the tape connection to its associated pulley which enables the tape to deviate from diametric, i.e., 180 degree contact with the circular surface results in readout variations which are unacceptable where stringent scale accuracy is required. In particular, the restraining elements for each pulley segment 7a,b,c,d comprise parallel surfaces defining a uniform gap between tape support posts 18a,b,c,d and restraint plates 19a,b,c,d.

In order to overcome excessive manufacturing tolerances which would inevitably exist in large production runs, a thin elongated rubber sheet 20a which acts as a preload spring is sandwiches between restraint plate 19a and side plate 21 for base 6 (see FIG. 3). Similarly, rubber preload spring 20b is sandwiched between restraint plate 19b and side plate 21. The elastic characteristic of preload springs 20a and 20b serves to effect and maintain a tight sandwiching of pulley segment 7a between elements 18a and 19a, pulley segment 7b between elements 18b and 19b, pulley segment 7c between elements 18c and 19c and pulley segment 7d between elements 18d and 19d. This tight sandwiching assures that the tapes form a diametric contact.

The movable elements comprising pulley 7, ratio-arm shafts 9 and 10, and ratio arms 11 and 12 are movably supported on a pair of side plates 21 and 28. Side plates 21 and 28 are fixed to one another by connecting rods 29, 30 and 31. The side plates are movably supported relative base 6 by pulley-tape subcombinations 7-8 so that the side plates are able to move downwardly together with the platform in response to the placement of weight 4 on the platform 5. The corresponding composite motion of small pulley segments 7a,b,c,d produces a corresponding composite motion in ratio arms 11 and 12 as previously described. The resulting change in capacitance of differential capacitor 15 due to the change in the relative position of the variable capacitor plate 14 with respect to the stationary capacitor plates 17a,b,c,d, produces a voltage variation which produces a weight responsive readout in unit 3.

Each of side plates 21 and 28 cooperates with motion limiting plates 32 and 33 which operate in slots 34 and 35 in such a manner that downward movement of side plates 21 and 28 is ultimately restrained by limiting plates 32 and 33.

The mechanical construction of differential capacitor 15 is best shown in FIGS. 4 through 12 with particular reference being made to the exploded view of FIG. 5. The electrical connection of the various plates, fixed and variable, of differential capacitor 15 is shown in FIG. 13.

Briefly, upper fixed plates 17a and 17c are connected in multiple, and lower fixed plates 17b and 17d are also connected in multiple. Variable capacitor plate 14 is movably disposed between the two sets of fixed capacitor plates and moves generally in a vertical plane.

Fixed plates 17a and 17b are each copper-clad rectangular segments applied to insulating board 36; and fixed plates 17c and 17d are each copper-clad rectangular segments applied to insulating board 37. Fixed plates 17a is electrically isolated from fixed plate 17b by insulating board strip 38; and fixed plate 17c is electrically isolated from fixed plate 17d by insulating board strip 39.

Insulating board 36 is fixed to transducer support 40 by bolts 41 which pass through insulating washers 42 and bottom spacers 43.

Similarly, insulating board 37 is fixed to transducer support 44 by bolts 45 which pass through insulating washers 46 and bottom spacers 47. Boards 36 and 37 are spaced and fixed relative one another at their upper portion by bolts 48 which engage upper spacers 49.

Figure 9:
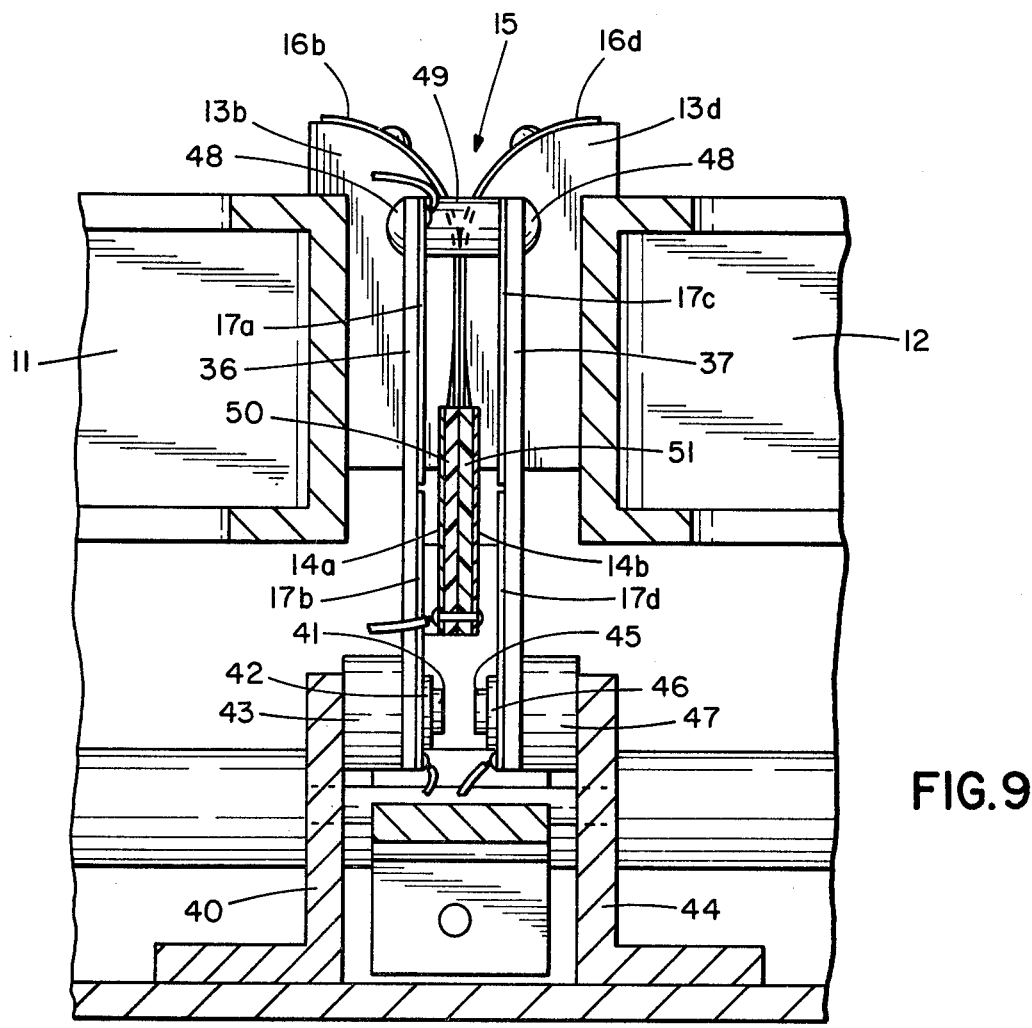
FIG. 9 is a section view taken along lines 9—9 of FIG. 8 which shows in cross section the capacitor plates and certain of the capacitor associated pulley segments.

Variable capacitor plate 14 is formed from two copper-clad rectangular segments 14a and 14b applied to two joined insulating boards 50 and 51 (FIG. 9). Drive segments 52 and 53 (FIG. 5) integral with boards 50 and 51 project beyond capacitor plate segments 14a and 14b. Tapes 16a,b and spring suspension block 54 are fixed to drive segment 52, and tapes 16c,d and suspension block 55 are fixed to drive segment 53.

The upper end of tape 23 is fixed to block 54 by screw 56, and the upper end of tape 24 is fixed to block 55 by screw 57. The lower end of tape 23 is fixed to radius block 25 by screw 58, and the lower end of tape 24 is fixed to radius block 26 by screw 59.

The left end of flat measuring spring 22 (FIG. 5) is fixed to radius block 25 by screw 60, and the right end of measuring spring 22 is fixed to radius block 26 by screw 61.

Figure 12:
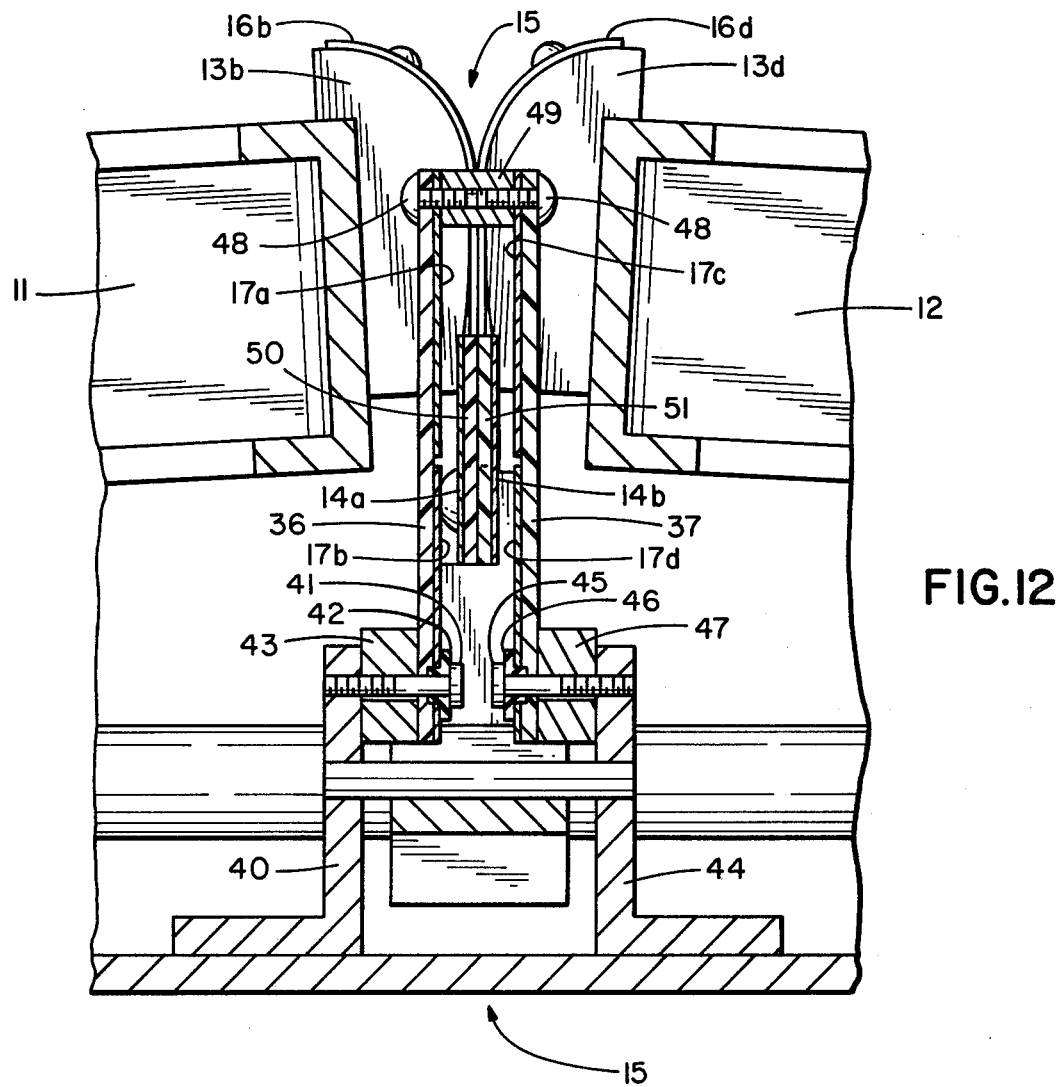
FIG. 12 is a section view taken along line 12—12 of FIG. 11 which shows in cross section the weight responsive movement of the variable capacitor plate.

The foregoing coupling of components to drive segments 52 and 53 moves variable capacitor plate 14 relative to fixed plates 17a,b,c,d in response to movements of ratio arms 11 and 12 (FIGS. 10 and 12). The movement of variable capacitor plate 14 is weight responsive due to the movement restraining force exerted by the flexing of measuring spring 22 (FIG. 11).

Figure 8:
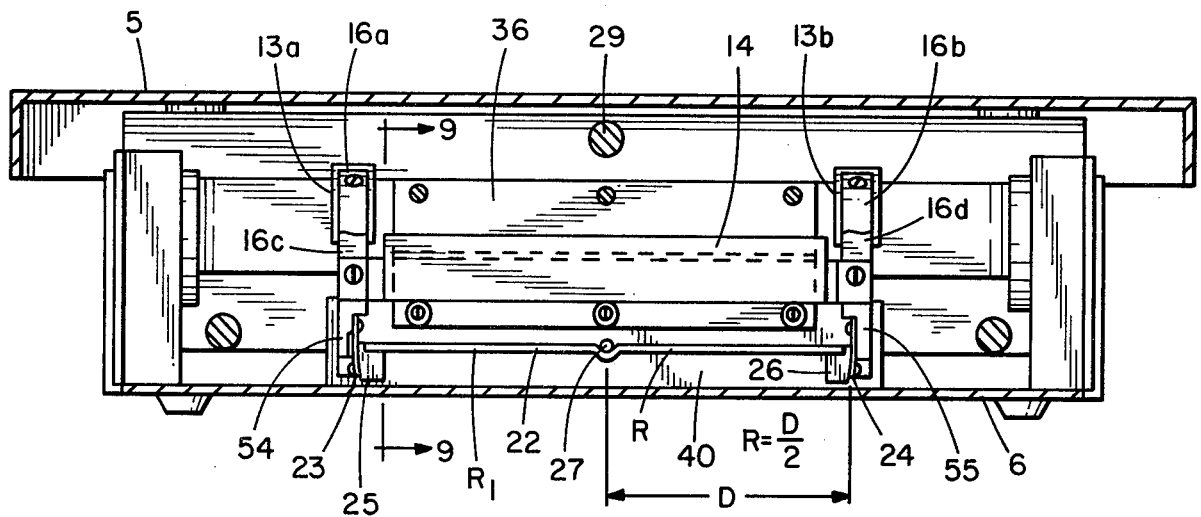
FIG. 8 is a section view taken along line 8—8 of FIG. 7 which shows in side elevation some of the capacitor plates of the weight responsive transducer.

The restraining force exerted by measuring spring 22 increases directly proportional to the upward movement of variable capacitor plate 14. This critical force-movement relationship is attained by making the tape 23, 24 contacting radius surface of each of radius blocks 25 and 26 equal to R where R=D/2 (FIG. 8). D is the distance from the center of measuring-spring anchor pin 27 to the tape contacting surface of a radius block. In general, therefore, measuring spring 22 is anchored at its center by pin 27 and each half of spring 22 flexes upwardly about D/2 midpoints R and $R_1$ (FIGS. 8, 11).

Rubberlike preload spring 62 is sandwiched between tape 24 and radius block 55 (FIG. 5). The resiliency of preload spring 62 compensates for any excessive tolerance variations which might tend to produce an error producing flexure in measuring spring 22 when no weight is on the scale platform 5.

Differential capacitor 14 employs to advantage two double segmented fixed plates 17a,b and 17c,d spaced from one another with variable capacitor plate 14 located between the fixed plates. Accordingly, variable plate 14 is electrically enclosed and is thus shielded from external sources of noise. Additionally, should misalignment occur in the sense that variable capacitor plate 14 moves clear to one set of double-segmented fixed plates and farther away from the second set, capacitance variations are essentially cancelled out.

If the differential capacitor was fabricated with a plurality of fixed plates located on one side of the variable plate, misalignment compensation and shielding would be essentially absent.

The capacitance of variable capacitor plate 14 to fixed plates 17a,b is expressed as $C+\Delta C$, and the capacitance of variable capacitor plate 14 to fixed plates 17c,d is expressed as $C-\Delta C$. C is the capacitance of variable plate 14 to each set of fixed plates 17a,b or 17c,d when variable plate 14 is symmetrically disposed vertically between both sets of fixed plates. $\Delta C$ is the incremental change in capacitance which occurs when the variable plate is elevated from a position of symmetry and $-\Delta C$ is the incremental change in capacitance which occurs when the variable plate is lowered from a position of symmetry.

When variable capacitor plate 14 is symmetrically disposed between fixed capacitor plates 17a,b,c,d, the voltage appearing between the variable plate and the fixed plates is zero. As is hereafter set forth, this voltage condition represents a typical midscale weight reading of 100 lbs., for example, when the typical range of the scale is 0 to 200 lbs.

In the normal, or no weight condition of the scale, variable capacitor plate 14 is not symmetrically disposed relative fixed plates 17a,b,c,d. The horizontal centerline of plate 14 is located approximately 0.1" below the horizontal centerlines of the separation gaps dividing plates 17a and 17b and plates 17c and 17d. When the maximum weight of 200 lbs. is placed on the scale, variable capacitor plate 14 moves upwardly a total of 0.2" in a preferred embodiment. Accordingly, variable capacitor plate 14 moves from one unsymmetrical position represented by $-\Delta C$, to symmetry at midweight range, and to a second unsymmetrical position represented by $+\Delta C$.

As is hereafter set forth, the differential capacitor variations from $-\Delta C$ to $+\Delta C$ result in the application to point A (FIG. 13) of square-wave signals which change phase 180° at the midweight range of the scale when $-\Delta C$ and $+\Delta C$ both equal zero.

Figure 14:
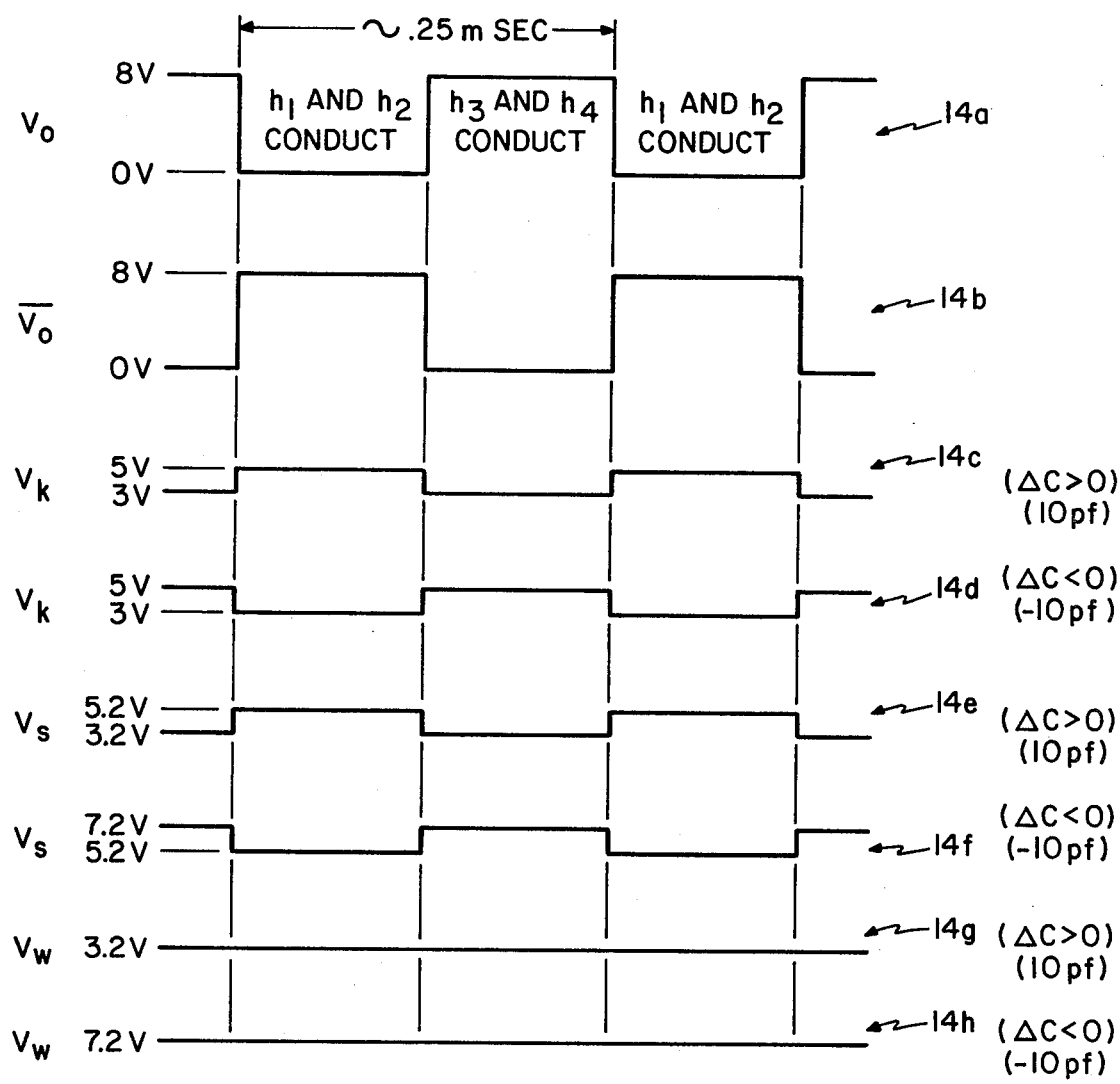
FIG. 14 is a graph showing typical voltage waveforms at various critical points in the schematic circuit of FIG. 13.

Referring to FIG. 14, square-wave voltage is applied to the fixed capacitor plates at points B and C by a conventional oscillator which comprises inverters E and F interconnected by resistors 63 and 64 and capacitor 65. The output voltage of the square-wave oscillator is applied to buffer inverter G which minimizes the loading on the oscillator to thereby improve the form of the square wave. Accordingly, the rise and fall times of the square wave appearing at the output of inverter G are significantly shortened.

The sharpened signal appearing at the output of buffer inverter G is applied to the input of inverter D. Inverter D serves only a single function; namely, to invert the square-wave signal appearing at the inverter D input terminal B and to apply the inverted output signal to terminal C.

Accordingly, the two sets of fixed plates 17a,b and 17c,d are subjected to a square-wave voltage Vo and its complement $\overline{Vo}$. Vo is also applied to terminal 66 and $\overline{Vo}$ is applied to terminal 67 of phase-sensitive discriminator H as a reference square-wave phase voltage. In a preferred embodiment, the voltage Vo, $\overline{Vo}$ is a square-wave voltage having a peak amplitude range from 0 to 8 volts at a frequency of 4000 Hz.

Phase sensitive discriminator H incorporates four MOSFET transistors $h_1$, $h_2$, $h_3$, $h_4$ operating in the enhancement mode. Transistors $h_1$ and $h_4$ are P channel, and transistors $h_2$ and $h_3$ are N channel. Vo is applied directly to the gates of $h_1$ and $h_3$, and $\overline{Vo}$ is applied directly to the gates of $h_2$ and $h_4$. The bases or substrates of $h_1$ and $h_4$ are connected to ground or 0 power supply volts, and the bases or substrates of $h_2$ and $h_3$ are connected to the 8 volt power supply terminal. The source S of $h_1$ is connected to the source S of $h_2$ and the drain D of $h_1$ is connected to the drain D of $h_2$. The drain D of $h_3$ is connected to the drain D of $h_4$, and the source S of $h_3$ is connected to the source S of $h_4$.

Transistors $h_1$ and $h_2$ form a COS/MOS transmission gate which acts as a single-pole, single-throw switch formed by the parallel connection of a p-channel device and an n-channel device. The switch is closed when Vo is at 0 volts and $\overline{Vo}$ is at 8 volts. Likewise $h_3$ and $h_4$ form a similar gate and switch which is closed when Vo is at 8 volts and $\overline{Vo}$ is at 0 volts.

Filter capacitor 68 is connected to the output terminals 69 and 70 of phase sensitive discriminator H. As is hereafter set forth in detail, a peak voltage ranging from $-2$ volts to $+2$ volts is developed across filter capacitor 68, and the voltage is added to the fixed power-supply voltage-divider voltage of 5.2 voltage appearing at terminal 70. Accordingly, a weight responsive voltage ranging from 3.2 volts (at maximum $-\Delta C$, when no weight is on scale platform 5) to 7.2 volts (at maximum $+\Delta C$ when a maximum weight of 200 pounds in on scale platform 5) is applied to terminal 71 of digital voltmeter DVM. The readout scale of voltmeter DVM is translated to read in terms of weight, rather than voltage, in the range of 0 to 200 pounds, for example.

Whether the voltage appearing across filter capacitor 68 adds to or subtracts from the fixed power supply voltage of 5.2 volts appearing at terminal 70 depends on the phase of the square-wave voltage $V_s$ appearing at terminal 72 of phase-sensitive discriminator H. The peak-to-peak amplitude of the $V_s$ voltage is added to or subtracted from the fixed power supply voltage of 5.2 volts. Thus, the phase relationship of $V_s$ relative Vo and $\overline{V_o}$ and the peak-to-peak amplitude of $V_s$ in a maximum range of $-2$ volts to $+2$ volts determines the pound weight readout at DVM.

$V_s$ is the output signal generated by an operational amplifier comprising inverters I, J and K. The output signal S of differential capacitor 15 appearing on variable capacitor plate 14 is applied to the input of inverter I through resistor 77.

Resistors 75 and 76 feed direct-current voltage from the output of inverter K to the input of inverter I through low ohmage resistor 77; thus setting the direct-current voltage values of all inverters I, J and K at about 4 volts. Capacitor 78 prevents all alternating-current voltage feedback through resistors 75 and 76 at the weight measuring square-wave frequencies of 4000 Hz. and harmonics.

Resistor 77, connected to the input of inverter I is a parasitic suppressor and does not otherwise affect the intended operation of the circuitry. Components 79, 80 and 81 serve as a feedback stabilization filter. The open loop gain of the operational amplifier between the input of inverter I and the output of inverter K is typically 30,000 at the square-wave frequency of the oscillator. Feedback capacitor 82 (Cf) connected between the input and the output of the operational amplifier comprising inverters I, J and K is critical to the proper operation of the circuitry.

When the open loop gain of the operational amplifier is very high, the following simplified equation expresses the relationship between Vo and $V_s$:

$$Vs = -(2\Delta C/Cf)Vo$$

The foregoing voltage relationship remains independent of frequency as long as the open loop gain remains high. This operational condition persists in a frequency range of at least 1000 to 100,000 Hz for the operational amplifier shown. Consequently, the 4000 Hz. square-wave input to the operational amplifier produces square-wave output signals Vs with zero phase shift when $\Delta C$ is less than zero, and 180° phase shift when $\Delta C$ is greater than zero.

The above equation also establishes that $V_s$ is also proportional to the magnitude and sign of $\Delta C$. Accordingly, differential capacitor 15 is constructed to be a low temperature coefficient unit which produces a $\Delta C$ proportional to the variable capacitor plate 14 displacement and in which $\Delta C$ assumes both positive and negative values. A suitable measuring spring 22 design for differential capacitor 15 provides for variable capacitor plate 14 displacement which is proportional to weight.

It should be noted that it is not necessary for optimum circuit operation that $\Delta C$ varies symmetrically from, for example, $-10$ pf to $+10$ pf. With proper circuit adaptation employing direct-current bias, $-8$ pf to 12 pf, or even zero to $+20$ pf, for example, would also be operational.

The circuit has been constructed so that weight sensitivity is essentially independent of moderate variations in the supply voltage. Accordingly, the 8 v direct-current supply voltage shown in FIG. 13 may vary within such limits as $-9$ to $-7$ volts as is commonly obtained from batteries, depending on their state of aging or use, without affecting scale accuracy.

Digital voltmeters are commonly ratio measuring instruments that compare an unknown voltage with a reference voltage. In FIG. 13, the reference voltage is obtained from a voltage divider across the 8 v supply, between terminals 83 and 84. While variation of this voltage changes the voltage sensitivity of the DVM, it also changes in the same proportion the oscillator voltages Vo and Vo and thus the weight-representing voltage across terminals 69 and 70.

As may be seen in FIG. 13, the DVM reference voltage may be preset with potentiometer 86, thus effecting calibration of the scale span. Potentiometer 87 adds a small direct-current voltage to the signal input allowing scale null to be set.

Typical circuit waveforms are shown in FIG. 14, FIG. 14a shows the 8 volt, 4000 Hz. square wave Vo applied to differential capacitor 15 and to phase sensitive detector H. FIG. 14b shows the complement waveform Vo also applied to differential capacitor 15 and to phase sensitive detector H. It should be noted that MOSFET's $h_1$ and $h_2$ conduct during the first square-wave half cycle, and that MOSFET's $h_3$ and $h_4$ conduct during the second square-wave half cycle.

FIG. 14c shows the 3 to 5 volt Vk waveform appearing at the output of inverter K of the operational amplifier when $\Delta C > 0$ when a 200 pound weight is on the scale. FIG. 14d shows the 5 to 3 volt Vk waveform appearing at the output of inverter K when $\Delta C < 0$ and when no weight is on the scale.

FIG. 14e shows the 3.2 to 5.2 volt $V_s$ waveform applied to phase sensitive discriminator H when $\Delta C > 0$. The waveform of FIG. 14e corresponds to the waveform of FIG. 14c. FIG. 14f shows the 7.2 to 5.2 volt $V_s$ waveform applied to phase sensitive discriminator H when $\Delta C < 0$. The waveform of FIG. 14f corresponds to the waveform of FIG. 14d.

FIG. 14g shows the 3.2 direct-current voltage Vw applied to DVM as a weighing voltage corresponding to zero weight. FIG. 14h shows the 7.2 direct-current voltage Vw applied to DVM as a weighing voltage corresponding to 200 pounds weight.

It should be understood that the above described arrangements are illustrative of the principles of this invention, and that modifications can be made without departing from the scope of the invention.

What is claimed is:

1. In a differential capacitor circuit for generating an electrical signal at a variable capacitor plate proportional to the movement of the variable capacitor plate, the improvement comprising a pair of fixed spaced capacitor plates disposed in a generally parallel relationship with respect to one another with the variable capacitor plate being disposed between the fixed plates, and each of the fixed plates having double segments with each segment of a plate being electrically isolated from the other segment of the plate and with the opposite adjacent segments of both plates being connected directly together to form two segment sets to which a reference signal is applied.

2. The capacitator of claim 1 in which the variable capacitator plate is generally centrally disposed between the fixed space capacitor plates for movement in a plane generally parallel to the planes of the capacitator plates.

3. The capacitor of claim 2 in which the movable capacitor plate is movable to overlap adjustably more or less of the segments of both plates.

4. In electromechanical apparatus having an electromechanical transducer for generating an electrical signal proportional to the movement of a variable capacitor plate, the improvement comprising a differential capacitor having a pair of fixed spaced capacitor plates disposed in a generally parallel relationship with respect to one another with the variable capacitor plate being disposed between the fixed plates, each of the fixed plates having double segments with each segment of a plate being electrically isolated from the other segment of that plate and with opposite adjacent segments of both plates being electrically connected to one another, a power supply applying an alternating-current voltage to both commonly connected sets of opposite adjacent segments of the two plates, and signal output means connected to the variable capacitor plate generating an alternating-current output signal whose phase and amplitude is responsive to the relative positioning of the variable capacitor plate to the fixed plates.

5. The apparatus of claim 4 in which the alternating-current power-supply voltage is a square wave voltage, and the output signal is a square wave voltage.

6. The apparatus of claim 5 in which both alternating-current voltages are either in phase of 180° out of phase.

7. The apparatus of claim 6 comprising a phase-sensitive discriminator in which the alternating-current power-supply voltage and the alternating-current output signal are applied thereto and in which a direct-current output voltage is generated whose amplitude is responsive to both the phase of the alternating-current output signal and the peak-to-peak voltage of the output signal.

8. The apparatus of claim 7 comprising a readout device responsive to the direct-current output voltage.

9. In electromechanical weighing apparatus having an electromechanical transducer for generating an electrical signal proportional to the movement of a variable capacitor plate in response to the weight of an object being weighed, the improvement comprising a differential capacitor having a pair of fixed spaced capacitor plates disposed in a generally parallel relationship with respect to one another with the variable capacitor plate being disposed between the fixed plates, each of the fixed plates having double segments with each segment of a plate being electrically isolated from the other segment of that plate and with opposite adjacent segments of both plates being electrically connected to one another, a power supply applying an alternating-current voltage to both commonly connected sets of opposite adjacent segments of the two plates, and signal output means connected to the variable capacitor plate generating an alternating-current output signal whose phase and amplitude is responsive to the relative positioning of the variable capacitor plate to the fixed plates and thus to the weight of an object.

10. The apparatus of claim 9 in which the alternating-current power-supply voltage is a square wave voltage, and the output signal is a square wave voltage.

11. The apparatus of claim 10 in which both alternating-current voltages are either in phase or 180° out of phase.

12. The apparatus of claim 11 comprising a phase-sensitive discriminator in which the alternating-current power-supply voltage and the alternating-current output signal are applied thereto and in which a direct-current output voltage is generated whose amplitude is responsive to both the phase of the alternating-current output signal and the peak-to-peak voltage of the output signal.

13. The apparatus of claim 12 comprising a weight readout device responsive to the direct-current output voltage.

* * * * *